United States Patent Office 3,190,774
Patented June 22, 1965

3,190,774
COATED AMMONIUM NITRATE COMPOSITIONS OF IMPROVED STORAGE STABILITY
Joseph F. Wilson, Bartlesville, Okla., assignor to Phillips Petroleum Company, a corporation of Delaware
No Drawing. Filed Sept. 23, 1963, Ser. No. 310,900
15 Claims. (Cl. 149—7)

This invention relates to improving the storage stability of ammonium nitrate. In another aspect, it relates to a method of treating particulate ammonium nitrate with a coating agent to reduce the normal tendency of ammonium nitrate to swell and cake on standing. In another aspect, it relates to coated ammonium nitrate, which material has a reduced tendency to swell and is relatively free-flowing, such coated salt being useful as a fertilizer and in explosive compositions. In a further aspect, it relates to a novel two-component agent, useful in coating such salts as ammonium nitrate and to a method of preparing such agent.

Ammonium nitrate in powder, crystalline, or granular form has a normal tendency to undergo volume changes during storage. For example, ammonium nitrate is known to have five crystalline phases within the temperature range of −50 to 130° C. at one atmosphere pressure. These phases are: phase V, below −18° C.; phase IV from −18 to 32° C.; phase III, from 32 to 84° C.; phase II, from 84° to 125° C.; and phase I, from 125° to 175° C. (the melting point). Ammonium nitrate is generally stored under varying temperature conditions, for example −10° C. and lower in winter to temperatures as high as 40° C. and higher in summer. As seasonal and daily temperature changes occur, the salt may be in any one of several different phases, the transitions from one phase to another causing changes in volume of the salt. Where the salt is stored in bags, it is not uncommon to find that such bags have burst due to the swelling or increased volume occasioned by subjection of the bagged product to fluctuations in temperature. The bursting of such bags is of course undesirable since it may result in loss of the salt, damage to surroundings, etc. Similarly, where ammonium nitrate is used as the oxidizer component in composite type solid propellants, such as those where the ammonium nitrate is dispersed in a rubbery polymer binder, grains of such propellant will sometimes crack or crumble internally under temperature variations due to the volume change which accompanies the change in structure from one phase to another.

Another problem commonly associated with ammonium nitrate is its normal tendency to cake or become sticky on standing and form hard masses. This caking is usually attributable to changes in humidity, temperature, and/or pressure, and occurs under conditions during storing, shipping and handling. Caking of the salt presents difficulties in its handling, for example, where the salt is used as fertilizer, this caking tendency impairs the drillability of the fertilizer and increases the cost of uniformly distributing the fertilizer in the field because the caked fertilizer causes clogging of the distribution machine and many other problems. Also, where ammonium nitrate is used as an ingredient in explosive compositions, the caking tendency of such salt can adversely affect the sensitivity of said explosive composition, and may render it incapable of satisfactory detonation.

Many methods have been proposed, used, or patented in the past for improving the storage stability of ammonium nitrate, including treatment of the salt with various conditioning agents to prevent caking. While some of these methods and prior art conditioning agents have been satisfactory in providing some measure of storage stability, others have proven unsatisfactory, particularly with respect to swelling.

Accordingly, an object of this invention is to improve the storage stability of ammonium nitrate. Another object is to provide an improved method of coating ammonium nitrate to reduce its normal tendency to exhibit volume changes and cake on standing. Another object is to produce a coated ammonium nitrate product, which product is valuable as a free-flowing fertilizer with little or no tendency to swell and cake on standing. Another object is to provide improved explosive compositions containing coated ammonium nitrate, which explosive compositions are characterized by satisfactory sensitizing and detonating properties. A further object is to provide a novel material useful as a conditioning agent for salts that tend to cake and/or swell, and method for preparing such material. Further objects and advantages of this invention will become apparent to those skilled in the art from the following discussion and appended claims.

I have now discovered that the storage stability of ammonium nitrate can be improved by coating particles of the same with a novel coating agent comprising an admixture of a minor amount of an alkali metal salt of an alkylaryl sulfonic acid and a major amount of a silica-alumina having an $SiO_2$ content of 60 to 80 weight percent, an $Al_2O_3$ content of 7 to 14 weight percent, and an $Na_2O$ content of 3 to 10 weight percent, said coating agent hereinafter occasionally referred to as the novel two-component coating agent of this invention.

The silica-alumina, used as the major component of the coating agent of this invention, can be obtained as a commercially available, amorphous precipitated chemical compound which is sold under such trade names as Zeolex 7, Zeolex 23 and Sil-Flo, or the silica-alumina can be obtained by blending natural or synthetic silicas and aluminas. Such compound has relatively low $Al_2O_3$ and $Na_2O$ contents and a relatively high $SiO_2$ content, and usually further comprises small amounts of $K_2O$, $CaO$, $Fe_2O_3$, $MgO$ and water. Preferably, the silica-aluminas used in preparing the two-component anti-caking agent of this invention have an $SiO_2$ content of 68 to 75 weight percent, an $Al_2O_3$ content of 8 to 12 weight percent and an $Na_2O$ content of 4 to 9 weight percent. Table I sets forth the composition and properties of a typical silica-alumina which can be used, namely Zeolex 23.

*Table I*

| | |
|---|---|
| $SiO_2$ | 65 wt. percent. |
| $Al_2O_3$ | 12 wt. percent. |
| $Na_2O$ | 9.8 wt. percent. |
| Ignition loss | 9.5 wt. percent. |
| Refractive index | 1.55. |
| Oil absorption, g./100 g. | 130–135. |
| pH | 10–11. |
| Specific gravity | 2.1. |
| Particle size | 100% in 20–30 multimicron range. |

The alkylaryl sulfonates, employed in a minor amount as the other essential component of the novel coating agent of this invention, are water-soluble alkali metal salts of alkylaryl sulfonic acids which have a total of 7 to 30, preferably 10 to 20, carbon atoms per molecule with preferably 1–4 of these carbon atoms in each of the aliphatic hydrocarbon chains. The aryl portion of these compounds can be either benzene or naphthalene nucleus. These sulfonates can be prepared by the well-known procedure of sulfonating the corresponding alkyl aromatic compound and forming the alkali metal salt of the resulting sulfonic acid.

Representative alkylaryl sulfonates useful in the practice of this invention include the sodium salt of 2-n-butylbenzenesulfonic acid; the sodium salt of 3-tert-dodecylbenzenesulfonic acid; the potassium salt of 4-n-eicosylbenzenesulfonic acid; the potassium salt of 4-n-tetradecylbenzenesulfonic acid; the lithium salt of 4-tetracosylbenzenesulfonic acid; the disodium salt of 6-n-decylbenzene-p-disulfonic acid; the disodium salt of dimethylnaphthalene-1,2-disulfonic acid; the trirubidium salt of 5-tert-hexadecylbenzene-2,4,6-trisulfonic acid; the sodium salts of methylnaphthalenesulfonic acid, such as the sodium salts of 1-methylnaphthalene-2-sulfonic acid, 1-methylnaphthalene-4-sulfonic acid, and mixtures thereof; the sodium salt of 6-n-eicosylnaphthalene-1-sulfonic acid; the trisodium salt of 6,7,8-triethylnaphthalene-1,2,3-trisulfonic acid; the dicesium salt of 2,5-dimethylbenzene 1,3-disulfonic acid; the disodium salt of 4,6-di-n-decylnaphthalene 1,8-disulfonic acid; the potassium salt of 7-tert-dodecylnaphthalene-2-sulfonic acid; the sodium salt of 2,5-dimethylbenzenesulfonic acid; and the like, including mixtures thereof. Of these respective sulfonates, the sodium salts of methylnaphthalenesulfonic acid and dimethylnaphthalenesulfonic acid are preferred, such materials being commercially available, for example under the name Petro Ag.

The ammonium nitrate, in particulate form, is treated with an amount of the novel two-component coating agent of this invention sufficient to improve the storage stability of the ammonium nitrate. Generally, only a small amount of the coating agent is necessary to provide adequate protection against swelling and caking, with amounts in the range of 0.5 to 5 weight percent, preferably 1 to 3 weight percent, of the treated ammonium nitrate being generally applicable. As mentioned hereinbefore, the silica-alumina component comprises a major amount of the coating agent, while the sulfonate component comprises a minor portion of the coating agent. Generally, for most applications, the amount of the sulfonate component in the coating agent will be usually within the range between 0.5 to 15 weight percent, preferably in the narrow range between 1 to 10 weight percent, of the coating agent. Thus, when the coating agent is applied to the ammonium nitrate, the amount of sulfonate component in the coating can be exceedingly small, e.g., 0.01 weight percent of the treated ammonium nitrate.

Both of the components of the novel coating agent of this invention are solids and are inert with respect to the ammonium nitrate. The sulfonates are water soluble compounds which may be used in particulate form or applied in a hydrocarbon or an aqueous solution, for example a 5 to 75 weight percent solution, preferably about a 50 weight percent solution. Said sulfonates are also characterized by the fact that they are not dyestuffs.

The silica-alumina and sulfonate can be premixed, preferably by spraying the sulfonate onto the silica-alumina and tumbling the resulting mixture, and the mixture thereafter coated on the particulate ammonium nitrate, for example by tumbling, or the sulfonate and silica-alumina components can be added simultaneously to the particulate ammonium nitrate, for example by tumbling the two components and the nitrate. The silica-alumina can be dried before being admixed with the sulfonate or the two-component mixture can be subsequently dried after mixture, or both methods of drying can be used. Whatever drying method is used, the final coating agent will normally contain from 0.5 to 8 weight percent water, preferably from 1 to 4 weight percent water. Generally, the silica-alumina component of the coating agent will have a particle size from 0.01 to 60 microns, preferably more than 90 percent in the range of 0.02 to 1 micron. The sulfonate component generally will be quite fine, preferably having a particle size less than 100 mesh if dry mixing with the silica-alumina component is used.

The treated or coated ammonium nitrate will generally have a moisture content not greater than 0.30 weight percent, preferably less than 0.20 weight percent. If desired, the coated ammonium nitrate can be subsequently dried if necessary to bring the moisture within such range.

I have surprisingly discovered that the coating of the ammonium nitrate with the novel two-component coating agent of this invention reduces both the swelling and normal caking tendency of the salt to a much greater extent than when the salt is treated with either the sulfonate itself, or the silica-alumina itself. Whereas the sulfonate itself is not effective in reducing the swelling and caking tendency of the ammonium nitrate when the latter is treated with the sulfonate, and whereas silica-alumina used by itself does not materially reduce the caking tendency of the ammonium nitrate when the same is treated with the silica-alumina, the combination of the major amount of silica-alumina with the minor amount of sulfonate, according to this invention, overcomes both the normal tendency of the ammonium nitrate to swell and its normal tendency to cake on standing. It takes only a relatively small amount of the coating agent of this invention to materially lower the swelling and caking tendencies of the ammonium nitrate.

As mentioned hereinbefore, the treated ammonium nitrate is useful in explosive compositions where such salts are used in admixture with combustible carbonaceous material. Generally, the explosive compositions of this invention will contain a major amount of the hereindescribed treated ammonium nitrate as oxidizer, and a minor amount of combustible carbonaceous material. Usually this will be in the range between 93 to 98 weight percent of the treated ammonium nitrate and 2 to 7 weight percent of the carbonaceous material. The combustible carbonaceous material employed in preparing these novel explosive compositions include any of those proposed or used heretofore. In particular, the combustible carbonaceous materials I prefer to employ are paraffinic hydrocarbons boiling in the range between 350 and 725° F., with an API gravity of from 20 to 60, and a viscosity of 25 to 140 SUS at 100° F. A specific combustible carbonaceous material of this type is diesel fuel. Other known solid combustible carbonaceous materials which can be employed include ground walnut hulls, asphalt, pitch, kerosene, coal tar, and the like. Liquid combustible carbonaceous materials are preferred.

Although the novel two-component coating agent of this invention when used by itself is sufficient to satisfactorily reduce or prevent the normal swelling and caking tendencies of ammonium nitrate treated therewith, that is, the two-component mixture can serve as the sole essential agent necessary to reduce caking and swelling, it is also within the scope of this invention to utilize other known coating agents in combination with the two-component agent of this invention.

The objects and advantages of this invention are further illustrated by the following examples, but it should be understood that the various materials, amounts, temperatures, and other details of these examples are illustrative of preferred embodiments of this invention and these examples should not be construed to limit unduly this invention.

EXAMPLES

A number of runs were carried out in which the sodium salt of methylnaphthalene sulfonic acid (Petro Ag) was admixed with a silica-alumina (Zeolex 23) to prepare the novel coating agent of this invention, after which prills of ammonium nitrate were coated with said coating agent to reduce the normal tendencies of the ammonium nitrate to swell and cake on standing. In each of these runs, the sulfonate was dry mixed with the silica-alumina in an amount sufficient to provide a coating agent containing a certain amount of said sulfonate. Rapid agitation was employed to ensure homogenity, and the mixture was allowed to stand in a sealed jar for a minimum of 24 hrs. The dried agent was then tumbled onto the ammonium nitrate prills for approximately 10 min. The moisture content of the coated prills was then determined, after which the coated prills were then evaluated to determine the extent of swelling and caking. Similar runs were carried out, for purposes of comparison, in which the ammonium nitrate prills were coated individually with the sulfonate per se, the silica-alumina per se, other coating agents per se, and the latter in admixture with the sulfonate. Uncoated ammonium nitrate prills were also evaluated.

To evaluate swelling, the samples of the ammonium nitrate were placed in 4-oz. sample bottles, after which the bottles were tightly sealed by stoppers. The bottles were then subjected to temperature cycling between 38 and 115° F. Every time the temperature was elevated to 115° F., it was counted as one temperature change. Thus, the full cycle of from 38 to 115° F. and back to 38° F. was considered as two temperature changes. In reporting hereinbelow the results of the swelling test, all the swelling values given are for 11 temperature changes, except those for the controls with no caking agent or with sulfonate per se, which are given for 12 and 9 temperature changes, respectively. The volume increase of the ammonium nitrate in each bottle was measured by measuring the level of the ammonium nitrate in the bottle with a meter stick. Since the diameter of the bottle was constant an increase in the height of the ammonium nitrate in the bottle is directly proportional to volume increase. In general, the greater the number of temperature changes, the more adverse effect of the same on swelling tendencies.

The tendency of the ammonium nitrate samples to cake on standing was evaluated by a "cake test," a procedure which is a modification of that described in Agr. Chem., 17, 42 (1962). In the "cake test," 65 g. portions of the ammonium nitrate was poured into polyethylene cylinders fabricated of two layers of 1.5 mil wall thickness polyethylene. The inside diameter of the cylinders was 1⅞ in., and the ends of the cylinders were blocked with Lucite blocks ½ in. thick. The blocks were held in the cylinders by means of cellophane tape. The loaded cylinders were then placed in a brass mold containing three holes, each 4 in. deep 2 in. in diameter. A bellows was then attached to the top of the mold so as to supply 24 p.s.i. air pressure to the ammonium nitrate particles in the cylinders The entire arrangement was then placed in an oven which was fitted with both heating and cooling means. The samples were then heated from 50 to 140° F. and maintained 3 hrs., after which the samples were cooled to 50° F. over a 3 hr. period. The full cycle of from 50 to 140° F. and back to 50° F. required 6 hrs., and this cycle was carried out three times, requiring a total time of 18 hrs. for three full cycles. The samples were then removed from the oven and let stand until they reached room temperature. The ammonium nitrate cakes which had formed were then removed from the cylinders, and the cakes were tested to breaking or crushing in a Carver commercial press. The total pressure required to break each cake was recorded, and since the corresponding sectional area of each cake was 2.75 sq. in., the breaking pressure in p.s.i. was calculated and recorded Where this procedure resulted in ammonium nitrate samples which did not cake but rather were free-flowing, these samples were designated "FF" And where the procedure resulted in ammonium nitrate cakes which collapsed upon subjection to initial pressure (i.e., less than 10 p.s.i.) in the Carver press before a pressure reading could be noted, such examples were designated as "LB" to denote light bridging and collapse of the cakes to free-flowing prills.

Data for the swelling and cake test and the results obtained by these procedures are set forth in Table II.

Table II

| Run | Water content of nitrate, wt. percent | Coating agent | Amt. of coating agent on nitrate, wt. percent | Crushing strength of coated nitrate, p.s.i. | Swelling of coated nitrate, percent |
|---|---|---|---|---|---|
| 1 | 0.10 | None | 0 | >200 | 62 |
| 2 | 0.10 | Sulfonate | 0.03 | 310 | 19 |
| 3 | 0.11 | do | 0.1 | 200 | 8.5 |
| 4 | 0.09 | Silica-alumina | 0.5 | 360 | 13 |
| 5 | 0.10 | do | 1.0 | 250 | 8.2 |
| 6 | 0.11 | do | 3.0 | LB | 6 |
| 7 | 0.11 | Silica-alumina+0.3 wt. percent sulfonate. | 0.5 | 360 | 9.5 |
| 8 | 0.10 | do | 1.0 | 190 | 8 |
| 9 | 0.09 | do | 3.0 | LB | 4.8 |
| 10 | 0.10 | Silica-alumina+5.0 wt. percent sulfonate. | 0.5 | FF | 10.5 |
| 11 | 0.10 | do | 1.0 | FF | 9 |
| 12 | 0.11 | do | 3.0 | FF | 2 |
| 13 | 0.09 | Kaolinite | 0.5 | 365 | 23 |
| 14 | 0.09 | do | 1.0 | 270 | 19 |
| 15 | 0.11 | do | 3.0 | 220 | 6.4 |
| 16 | 0.10 | Kaolinite+0.3 wt. percent sulfonate. | 0.5 | LB | 23 |
| 17 | 0.10 | do | 1.0 | LB | 13.5 |
| 18 | 0.11 | do | 3.0 | LB | 7 |
| 19 | 0.10 | Kaolinite+5.0 wt. percent sulfonate. | 0.5 | FF | 22 |
| 20 | 0.11 | do | 1.0 | FF | 12.4 |
| 21 | 0.12 | do | 3.0 | FF | 8 |
| 22 | 0.09 | Attapulgite | 0.5 | 390 | 10.7 |
| 23 | 0.10 | do | 1.0 | 330 | 11 |
| 24 | 0.11 | do | 3.0 | 180 | 7.3 |
| 25 | 0.10 | Attapulgite+0.3 wt. percent sulfonate. | 0.5 | 280 | 17.5 |
| 26 | 0.10 | do | 1.0 | 240 | 11.1 |
| 27 | 0.11 | do | 3.0 | LB | 12 |
| 28 | 0.11 | Attapulgite+5.0 wt. percent sulfonate. | 0.5 | 140 | 15.5 |
| 29 | 0.12 | do | 1.0 | 90 | 9.7 |
| 30 | 0.12 | do | 3.0 | FF | 10 |
| 31 | 0.10 | Diatomaceous earth | 0.5 | 465 | 20 |
| 32 | 0.11 | do | 1.0 | 420 | 14 |
| 33 | 0.13 | do | 3.0 | 150 | 11.1 |
| 34 | 0.10 | Diatomaceous earth+0.3 wt. percent sulfonate. | 0.5 | 460 | 17.5 |
| 35 | 0.12 | do | 1.0 | 410 | 15 |
| 36 | 0.14 | do | 3.0 | 260 | 12 |
| 37 | 0.11 | Diatomaceous earth+5.0 wt. percent sulfonate. | 0.5 | 185 | 17.1 |
| 38 | 0.12 | do | 1.0 | LB | 15.5 |
| 39 | 0.14 | do | 3.0 | FF | 9.5 |

The data of Table II show that the novel two-component coating agent of this invention (Runs 7-12) is surprisingly effective in materially reducing the normal tendencies of the ammonium nitrate to swell and cake on standing.

Various modifications and alterations of this invention will become apparent to those skilled in the art without departing from the scope and spirit of this invention, and it should be understood that this invention is not to be limited unduly to that set forth herein for illustrative purposes.

I claim:

1. A method for improving the storage stability of particulate ammonium nitrate, which comprises coating said ammonium nitrate with a coating agent comprising in admixture a minor amount of an alkali metal salt of an alkylaryl sulfonic acid and a major amount of a silica-alumina having an $SiO_2$ content of 60 to 80 weight percent, an $Al_2O_3$ content of 7 to 14 weight percent, and an $Na_2O$ content of 3 to 10 weight percent, said agent being employed in an amount sufficient to improve the storage stability of said ammonium nitrate.

2. The method according to claim 1, wherein the amount of said agent on the ammonium nitrate is 0.5 to 5 weight percent, and said alkali metal salt amounts to about 0.5 to 15 weight percent of said agent.

3. The method according to claim 1, wherein the amount of said agent on the ammonium nitrate is 1 to 3 weight percent, and said alkali metal salt amounts to about 1 to 10 weight percent of said agent.

4. A method according to claim 1 wherein said alkylaryl sulfonic acid has a total of 7 to 30 carbon atoms per molecule, and where the aryl portion of the molecule is selected from the group consisting of benzene and naphthalene groups.

5. A method according to claim 4 wherein said alkali metal salt is the sodium salt of an alkylbenzene sulfonic acid.

6. A method according to claim 4 wherein said alkali metal salt is the sodium salt of an alkylnaphthalene sulfonic acid.

7. A method according to claim 1 wherein said alkylaryl sulfonic acid salt is the sodium salt of methylnaphthalene sulfonic acid.

8. A method according to claim 1 wherein said alkylaryl sulfonic acid salt is the sodium salt of dimethylnaphthalene sulfonic acid.

9. As a new composition of matter, particulate ammonium nitrate coated with a coating agent comprising in admixture a minor amount of an alkali metal salt of an alkylaryl sulfonic acid and a major amount of a silica-alumina having an $SiO_2$ content of 60 to 80 weight percent, an $Al_2O_3$ content of 7 to 14 weight percent, and an $Na_2O$ content of 3 to 10 weight percent, the amount of said agent on said ammonium nitrate being sufficient to improve the storage stability of said ammonium nitrate.

10. As a new composition of matter, particulate ammonium nitrate coated with 0.5 to 5 weight percent of a coating agent comprising 0.5 to 15 weight percent of the sodium salt of an alkylaryl sulfonic acid having a total of 7 to 30 carbon atoms per molecule wherein the aryl portion of said molecule is selected from the group consisting of benzene and naphthalene groups, and a silica-alumina having an $SiO_2$ content of 60 to 80 weight percent, an $Al_2O_3$ content of 7 to 14 weight percent, and an $Na_2O$ content of 3 to 10 weight percent.

11. As a new composition of matter, particulate ammonium nitrate coated with 0.5 to 5 weight percent of a coating agent comprising 1 to 10 weight percent of the sodium salt of an alkylaryl sulfonic acid having a total of 7 to 30 carbon atoms per molecule wherein the aryl portion of said molecule is selected from the group consisting of benzene and naphthalene groups, and a silica-alumina having an $SiO_2$ content of 68 to 75 weight percent, an $Al_2O_3$ content of 8 to 12 weight percent, and an $Na_2O$ content of 4 to 9 weight percent.

12. A new composition of matter according to claim 11, wherein said alkylaryl sulfonic acid is a methylnaphthalene sulfonic acid.

13. A method for making a coating agent, comprising contacting a solution of an alkali metal salt of an alkylaryl sulfonic acid with a silica-alumina having an $SiO_2$ content of 60 to 80 weight percent, an $Al_2O_3$ content of 7 to 14 weight percent and an $Na_2O$ content of 3 to 10 weight percent, agitating the resulting mixture, and drying the same.

14. As a new composition of matter, an admixture of a minor amount of an alkali metal salt of an alkylaryl sulfonic acid and a major amount of silica-alumina having an $SiO_2$ content of 60 to 80 weight percent, an $Al_2O_3$ content of 7 to 14 weight percent, and an $Na_2O$ content of 3 to 10 weight percent.

15. An explosive composition comprising a major amount of ammonium nitrate, coated with a coating agent, and a minor amount of a combustible carbonaceous material, said coating agent comprising in admixture a minor amount of an alkali metal salt of an alkylaryl sulfonic acid and a major amount of a silica-alumina having an $SiO_2$ content of 60 to 80 weight percent, an $Al_2O_3$ content of 7 to 14 weight percent, and an $Na_2O$ content of 3 to 10 weight percent.

References Cited by the Examiner

UNITED STATES PATENTS

| 2,720,446 | 10/55 | Whetstone et al. | 23—103 |
| 2,794,701 | 6/57 | Ames | 23—103 |
| 3,034,858 | 5/62 | Vives | 23—103 |
| 3,116,185 | 12/63 | Wilson et al. | 149—7 |

CARL D. QUARFORTH, *Primary Examiner.*